United States Patent
Hanna et al.

(10) Patent No.: US 6,263,434 B1
(45) Date of Patent: Jul. 17, 2001

(54) SIGNED GROUP CRITERIA

(75) Inventors: Stephen R. Hanna, Bedford; Anne H. Anderson, Acton; Yassir K. Elley, Waltham; Radia J. Perlman, Acton; Sean J. Mullan, Watertown, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/399,899

(22) Filed: Sep. 21, 1999

(51) Int. Cl.[7] ..................................................... A61F 2/38
(52) U.S. Cl. ........................ 713/156; 705/76; 713/155; 713/158; 713/171; 713/175; 713/179
(58) Field of Search ............................ 705/76; 713/156, 713/158, 155, 171, 175, 179

(56) References Cited

U.S. PATENT DOCUMENTS

| | | | |
|---|---|---|---|
| 5,311,591 | * 5/1994 | Fischer | 713/156 |
| 5,339,403 | * 8/1994 | Parker | 711/221 |
| 5,757,920 | * 5/1998 | Misra et al. | 713/158 |

OTHER PUBLICATIONS

Verisign, Verisign CPS, Verisign Certification Practice Statement, Version 1.2, May 15, 1997.*
ITU, Information Technology—Open Systems Interconnection—The Directory: Authentication Framework, Recommendation X.509, Nov. 1993.*

Network SecurtyPrivate Communication in a Public World, 1995, pp. 198–201.

* cited by examiner

Primary Examiner—Tod Swann
Assistant Examiner—Ronald F. Sulpizio, Jr.
(74) Attorney, Agent, or Firm—Weingarten, Schurgin, Gagnebin & Hayes LLP

(57) ABSTRACT

A method and apparatus for identifying an applicant as a member of a group without explicitly listing all possible applicants. A test is defined which specifies the criteria for group membership. The test definition and an optional group identifier code are supplied to a criterion generator. The criterion generator generates an authenticated message based, at least in part, upon said test definition. The authenticated message is delivered to one or more criterion evaluators that verify the authenticated message. In one embodiment, once the authenticated message has been verified, the applicant for access to a resource presents a credential to the criterion evaluator. If the credential satisfies the test definition, the applicant is granted access to the specified resource and denied access if the credential does not satisfy the test definition. In another embodiment, upon presentation of a suitable credential to the criterion evaluator, the criterion evaluator produces a group membership credential that may be presented to an actuator that is not in communication with the criterion evaluator. If the actuator determines that the group membership credential is authentic, the applicant is granted access to the resource.

39 Claims, 3 Drawing Sheets

SIGNED GROUP CRITERIA

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to techniques for verifying that an applicant is a member of a group having predetermined privileges without explicitly listing the members of the group.

In many computer and security systems, it is desirable to restrict access or privileges to a specified resource or a secure area to certain individuals. For example, it is necessary in certain situations to limit access to a secure area only to certain privileged individuals who require such access. Further, in other applications it is necessary or desirable to limit access or rights with respect to certain files, directories, databases, web pages or other computer resources to specific individuals within a defined group. Typically, the identification of the individuals or applicants who are "privileged" members of the group having access to the specified resource is accomplished by identifying the individuals that have access privileges in an access control list or in a group membership list. The applicants may, in differing applications constitute individuals, or alternatively, computer or electronic devices. The use of access control lists (containing an identification of group members along with their respective access rights) and group membership lists (containing an identification of group members) have certain disadvantages. Such lists must be kept current. The maintenance of such lists can be a formidable task for a large organization or community in which the legitimate members of the group change as a matter of course or access rights for the respective members vary over time.

It would therefore be desirable in certain applications to be able to determine whether an individual or applicant is a member of a group having the right of access to a resource without explicitly listing the members of the group. It would also be desirable to be able to perform this function in a secure manner so that an access granting authority can assure that unauthorized applicants are not improperly granted access to the resource.

BRIEF SUMMARY OF THE INVENTION

Consistent with the present invention a method and apparatus are disclosed for restricting access to a predetermined resource to certain members of a privileged access group. Such is accomplished without explicitly listing the members of the group. A test is defined which serves to identify whether an applicant is or is not a member of the privileged group. The test definition, and optionally, a group identification code is input to a criterion generator which may include a computer. The criterion generator forms a group criterion message based at least upon the test definition. The group criterion message may also include the group identification code. The criterion generator authenticates the group criterion message via use of a digital signature using well known public key encryption techniques, via use of a shared key or via any other suitable authentication technique. The authenticated group criterion message is then conveyed, either directly or indirectly, to at least one criterion evaluator. The criterion evaluator, which may also include a computer, serves to evaluate a credential or credentials presented by, or associated with, an applicant to ascertain whether the credentials satisfy the criterion for access to the resource specified within the test definition.

More specifically, upon receipt of the authenticated group criterion message, the criterion evaluator verifies that the group criterion message received by the respective criterion evaluator was actually sent by the criterion generator and that the information contained within the group criterion message, including the test definition and the group identification code (if present) were not modified. In response to the presentation of a credential or information by an applicant, the criterion evaluator then utilizes the test definition to determine whether the applicant should be granted access to the resource. In the event the credential or information presented by the applicant satisfies the test definition, access is granted. In the event that the credential does not satisfy the test definition, access is denied.

In the foregoing manner, once the signed group membership criterion has been received, access control determinations may be made securely without reference to any explicit list of group members and without contacting the trusted party that authenticated the group criterion message.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Consistent with the present invention, a method and apparatus are disclosed for identifying members of a group who are intended to have certain privileges or access rights without explicitly listing the members of the group. A system for identifying applicants (such as individuals, computers or other electronic devices) that are entitled to obtain access to specified resources as members of a defined group is depicted in FIG. 1.

Figure 1:
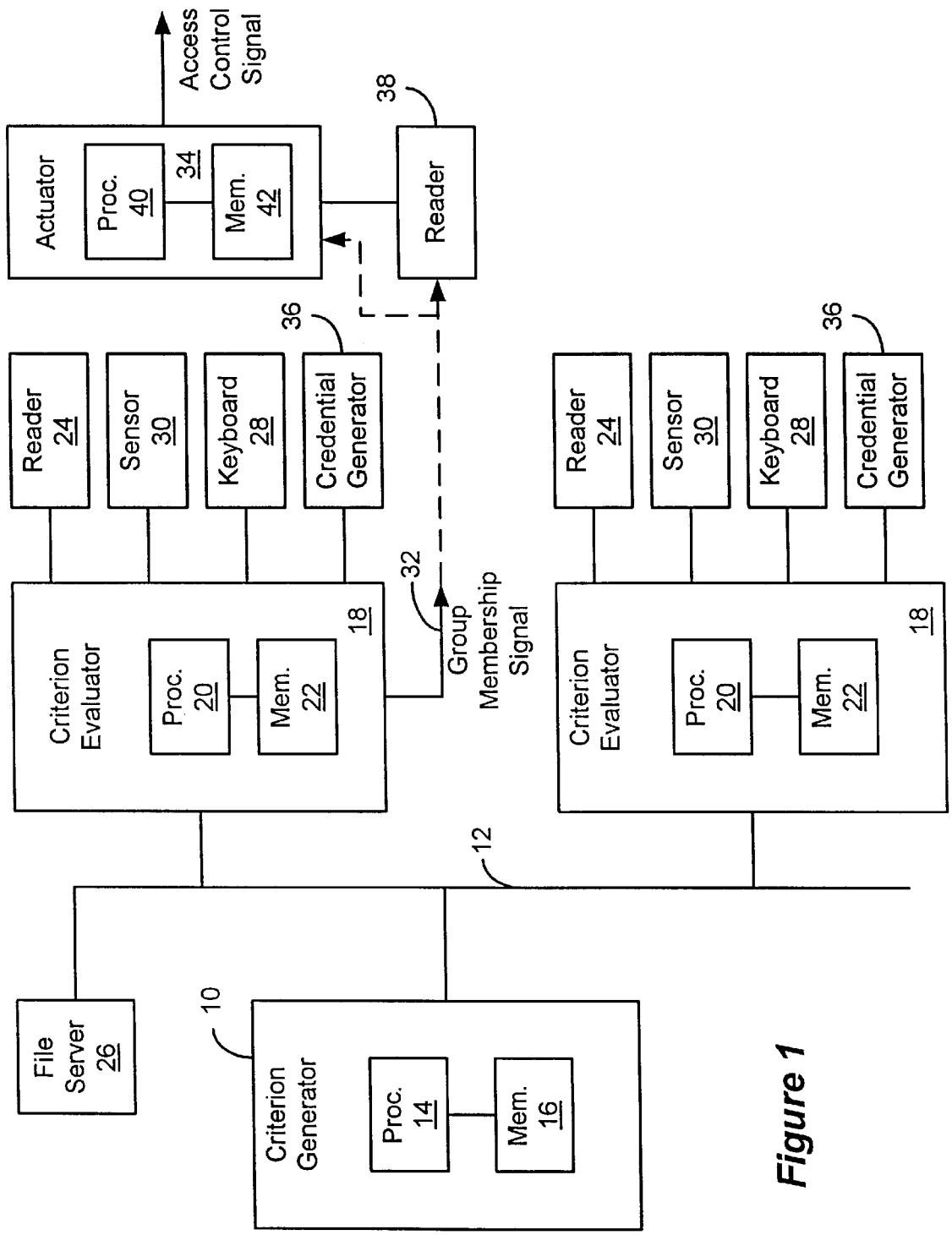
FIG. 1 is a block diagram illustrating apparatus operative in a manner consistent with the present invention.

Referring to the embodiment depicted FIG. 1, a criterion generator 10 is illustrated which is coupled to a network 12. The criterion generator 10 includes a processor 14, which is operative to execute a program stored in a memory 16 such as a ROM or RAM. The program executing on the criterion generator 10 generates a message which includes a test definition and optionally, a group identification code and other information as is hereinafter discussed, authenticates the message and conveys the authenticated message to one or more criterion evaluators. Though the memory 16 within the criterion generator is illustrated as a single memory for simplicity, it should be appreciated that the memory 16 may include memory portions of different types. For example, the memory 16 may include a ROM, which maintains an executable code image, and a RAM for temporary data storage. Alternatively, the code image may be executed out of a RAM.

The criterion generator 10 is provided with a test definition. The test definition forms the basis for determining which applicants satisfy the criteria for membership within a specified group, and accordingly, should be granted access to the resources attendant to membership within that group. In addition to the test definition, the criterion generator may be supplied with a group identification code, which serves to identify the group to which the test definition pertains. The group identification code is an identifier, which serves to uniquely identify the group. The test definition and the group identification code may be entered via a keyboard by an individual having appropriate management authority, may be conveyed to the criterion generator 10 from a remote computer over a network, such as the network 12, or may be input to the criterion generator 10 via any other suitable direct or indirect means. For example, the criterion generator may include an input device, which is employed to read the test criterion and/or group identification code.

The criterion generator 10 generates an authenticated group criterion message from the test definition or the test definition and group identification code if such is employed. The group criterion message may be authenticated using conventional public key digital signature techniques, via any other well known digital signature techniques, via use of a shared key or via any other suitable authentication technique known in the art. For example, a digital signature may be generated in accordance with the well known Rivest, Shamire and Adelman (RSA) algorithm, the El Gamal signature algorithm (ELGA85), the Digital Signature Standard (DSS) algorithm or any other suitable algorithm for generating a digital signature.

In one embodiment employing a digital signature, the criterion generator 10 applies a predetermined hash function to the group criterion message to generate a message digest. The criterion generator creates or is provided with a public key pair including a public key and a private key. The message digest is then encrypted with the private key of the criterion generator 10 to form the digital signature. The group criterion message and the digital signature are forwarded over the network 12 to one or more criterion evaluators 18. Alternatively, the group criterion message and the digital signature may be stored on a transportable magnetic, optical or other storage media, may be printed on a readable media such as via a bar code printer, or punched media for transport to a criterion evaluator 18.

The criterion evaluator(s) 18 verifies (verify) that the group criterion message has not been modified and that the group criterion message originated with the criterion generator 10. Such may be accomplished in the circumstance in which the message is digitally signed by confirming the digital signature using the public key of the criterion generator 10. More specifically, the criterion evaluator 18 applies to the received group criterion message the same hash function as employed by the criterion generator 10 to produce a message digest based upon the received message. Additionally, the criterion evaluator 18 decrypts the digital signature associated with the received group criterion message using the public key for the criterion evaluator. If neither the group criterion message nor the digital signature has been modified, the decryption of the digital signature using the public key of the criterion generator 10 produces a message digest which is the same as the message digest calculated by the criterion evaluator 18. The criterion evaluator compares the message digest calculated from the received message with the message digest generated by decrypting the received digital signature. A determination that the two digests are the same indicates to a virtual certainty that the received group criterion message was in fact generated by the criterion generator 10 holding the private key associated with the public key used to decrypt the received digital signature and that the received group criterion message has not been modified. The criterion evaluator can thus use the test criterion with confidence that the test will result in a proper determination that an applicant is a group member based upon a legitimate test definition.

After verification of the test definition, the criterion evaluator(s) applies the test definition to credentials presented by or associated with an applicant to ascertain whether the respective applicant is a member of the group (which may be identified by the group identification code). Once the applicant is confirmed as being a member of the group, the criterion evaluator asserts a group membership signal, which indicates that the applicant is a member of the group. In response to the assertion of the group membership signal, an actuator associated with the criterion evaluator may be activated to grant the applicant access to a specified resource or access to a secure location. Alternatively, the criterion evaluator(s) may, upon determining that the applicant has satisfied the criteria for group membership, generate a group membership credential for the member. The credential may be used by the member to obtain access to a resource at an actuator or device remote from and/or not in direct communication with the respective criterion evaluator 18.

Thus, using the signed group membership criterion distributed by criterion generator 10, it is possible to determine whether a given individual or applicant is a member of the designated group by applying the prescribed test definition within the criterion evaluator 18 without reference to an explicit membership list. Using the described technique, access privileges are granted or denied based upon the credential(s) presented by or associated with the applicant after the authenticated group criterion message has been distributed by the criterion generator to the criterion evaluators and the message has been verified by the criterion evaluator. This verification is accomplished without contacting the trusted party that authenticated the group criterion message.

Various types of resources may be made available to the individual or applicant for group membership once the test definition has been satisfied. By way of example, and not limitation, an applicant satisfying the test for group membership may be permitted to pass through a locked doorway upon presentation of a proper credential(s), may be permitted to operate prescribed machinery, may be permitted access to certain resources within a computer system such as files, directories, databases or any other computer resource, or may be permitted access to or the right to modify, a web page. Additionally, members of one group may be provided only read privileges for certain computer resources while members of another group may be provided read/write privileges. It should be appreciated that once the technique for defining and confirming group membership is understood, the presently described technique may be employed in any application in which it is desired to provide privileges to members of the defined group.

By way of further example, assume that the group to which access privileges are to be granted includes all persons within the Management Information Systems (MIS) Group and more specifically, only personnel within such group that have the title "System Administrators". The criterion generator consistent with this example would be supplied with a test definition as follows:

Test: OrgUnit="MIS"
    JobTitle="SysAdmin"
The criterion generator would additionally be provided with the group identification code as indicated below.
    Group Code: Code="Admins"
The test definition and the Group Code are supplied to the criterion generator via a keyboard by a system administrator, via any other direct input device or remotely over a network.

In response to the provision of the test definition and group identifier code, the criterion generator 10 combines the test definition with the group identifier code to form the group criterion message. The group criterion message in the above-identified test definition specifies the OrgUnit and the JobTitle, which will satisfy the test criteria and the group identification code "Admins". Additional fields may be included within the group criterion message as hereinafter discussed.

Next, the group criterion message is authenticated as discussed above and the authenticated group criterion message is forwarded to the criterion evaluator.

Upon receipt of the authenticated group criterion message, the criterion evaluator verifies the test definition and group identification code and then applies the specified test to credentials presented by or associated with applicant. For example, assume an applicant presents to a badge reader coupled to the criterion evaluator 18 an identification badge bearing an employee number. The criterion evaluator 18 may then access a central database within a file server 26, which maintains the OrgUnits and JobTitles of each employee by employee number. The criterion evaluator 30 retrieves the OrgUnit and the JobTitle for the applicant specified by the applicable employee number and compares the retrieved data to the criteria specified within the test definition. In the event the comparison results in a determination that the applicant's credentials satisfy the requisite criteria, the applicant is granted access to the resource or resources associated with membership in the group specified by the group identification code where the credentials do not satisfy the test definition.

In another embodiment the badge may contain all information necessary to establish whether the applicant satisfies the test definition such as the OrgUnit and the JobTitle as well as any other appropriate test criteria. Such information may be stored, such as on a badge via a magnetic stripe, or via any other suitable information storage technique and may be digitally signed or otherwise authenticated. In the circumstance in which all information necessary to establish whether the applicant satisfies the test definition is stored on a badge or other readable credential, access to a central database to obtain characteristics of the applicant is not required.

The test definition may take many forms. As illustrated above, the test may pertain to characteristics associated with the applicant's employment such as department, title, or any other job related information. The test may involve a determination as to whether the applicant can prove knowledge of a secret, such as a password or other information that would not be generally known to the public. If the test involves proof of knowledge of a secret, the applicant might be required to input information to the criterion evaluator to prove knowledge of the secret via a keyboard 28, via voice recognition apparatus (not shown) or any other suitable input device. Moreover, the test may be based upon a physical attribute of the applicant; e. g. the strength of the applicant (which may be important for reasons of safety when operating certain equipment), drug testing, mental characteristics or other characteristics of the applicant. A test definition may be predicated upon information obtained from test equipment or sensors coupled to the criterion evaluator 18 or alternatively, may involve attributes, which are proven via credentials issued by one or more trusted parties (such as a certification authority) which communicate the credential(s) to the criterion evaluator. The test definition may require that the applicant satisfy biometric analysis to establish his identify. In such an application, the applicant would provide input via a sensor 30, such as a fingerprint sensor, a retinal scan or a voiceprint sensor. The biometric data would then be compared against a biometric profile maintained in a database such as the database within file server 26. It is further noted that the test definition may compose a single criterion or multiple sub-criteria. For example, and not by way of limitation, a test definition may include the following criteria.

(drug test AND (background check OR personal reference)) In the above-identified example, the test criteria may be satisfied via credentials issued by a trusted party.

Timeliness criteria may also be applied to the test definition; i.e. in certain applications, it may be required to satisfy the test definition within a specified time prior to the granting of access to the applicable resource. For example, the test definition may be structured such that the applicant is required to prove sobriety immediately prior to starting the engine of a car or other potentially hazardous machine. Thus, the criterion evaluator may only permit access to be granted to the applicable resource within a specified period following the determination that the applicant satisfies the test definition.

Additionally, the test definition may involve negative criteria; i.e. a test to ascertain that an applicant does not possess a certain characteristic. For example, a test definition may include a test to ascertain that the applicant does not possess a police record, is not a member of a particular department or any other definable negative criteria.

The manner in which access is granted to the relevant resource may occur in several different ways. In one embodiment, the criterion evaluator may, in response to the generation of the group membership signal 32 grant the applicant access to the resource. Alternatively, the group membership signal may be coupled to an actuator 34, which is associated with or in communication with the criterion evaluator 18. The actuator 34 may include a processor 40 and a memory 42 and execute programs out of the memory necessary to implement the functions herein described. Alternatively, the actuator may comprise an electromechanical device, such as a device operative to release a door lock so as to allow access to a secure area. In the circumstance in which the actuator is coupled to the criterion evaluator 18, the criterion evaluator 18, upon determining that the applicant has satisfied the test definition for group membership, asserts a group membership signal 32 or provides an access control message to the actuator 34 which indicates that access to the resource should be granted to the applicant. It may be desirable for the criterion evaluator 18 to securely inform the actuator 34 of the outcome of the group membership determination made by the evaluator 18 if the communication link to the actuator is not protected.

Alternatively, an actuator 34 may be located remotely from the criterion evaluator 18 and not in communication with the criterion evaluator 18. In this circumstance, the criterion evaluator may generate a credential such as group membership certificate, which may be transported physically to the actuator 34 and read by the actuator 34 via a credential reader 38.

Moreover, in response to the group membership signal, a message may be provided to an applicant that indicates whether the applicant's credentials would satisfy the test definition without providing access to the relevant resource or secure area in the event the credentials satisfy the test definition.

In addition to the test definition and the group identification code, the group criterion message may include a message order indicator in the form of a sequence number, an issuance date or any other suitable indication of the order of the generation of the respective test definitions. A criterion evaluator, in one embodiment, may change the operative test definition to be applied to applicant's credentials upon receipt and verification of a group criterion message bearing a later message order indicator; i.e. the latter sequence number or a later issuance date. Moreover, in order to protect against obsolete test definitions, the group criterion message may include an expiration date. The relevant criterion evaluator 18 would not grant access to a resource even in the circumstance where an applicant's credentials satisfied the test definition if the current date was after the expiration date.

The signed group membership criterion may also be utilized by the criterion evaluator to inform a potential applicant of the criteria for group membership, such as by outputting the requirements needed to satisfy the test definition to obtain access to a specified resource for viewing on a video display by a user, by printing the requirements needed to satisfy the test definition or by otherwise outputting the test definition. In this manner, the potential applicant is provided with the information needed to ascertain whether the applicant possesses the credentials necessary to gain access to the resource without going through the application process. Such may avoid cost expenditures in certain circumstances, divulging information that the applicant may not wish to divulge, and/or avoid other undesirable aspects of the application process. Moreover, by avoiding the submission of credentials for consideration by the criterion evaluator, which will not pass the test criterion for group membership, processing resources are conserved.

Figure 2:
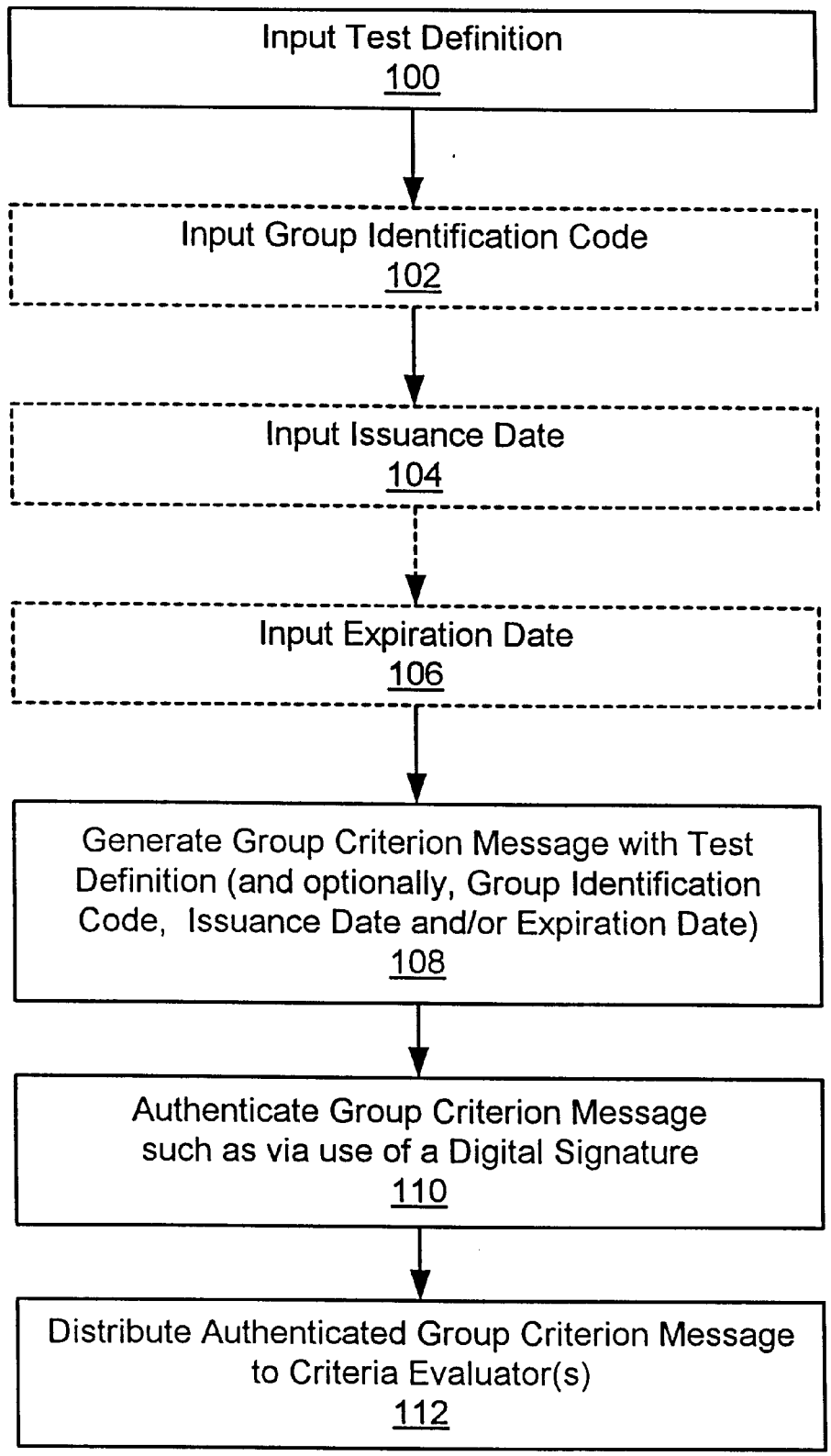
FIG. 2 is a flow diagram illustrating a method of operation for the criterion generator depicted in FIG. 1.

A method of operation of a criterion generator consistent with the present invention is illustrated by reference to FIGS. 1 and 2. As depicted in step 100, a test definition is generated and supplied to a criterion generator 10. The test definition may be input by a system administrator or provided by another computer or electronic device. Alternatively, the test definition may include information conveyed from a trusted party. Further, as illustrated in step 102, a group identification code is generated and supplied to the criterion generator 10. As indicated in steps 104 and 106, an issuance date for the test criterion and/or an expiration date for the test criterion may optionally be provided. The test definition and the group identification code (and the issuance date and/or the expiration date, if applicable) are combined to form a group criterion message as shown in step 108 which is then authenticated. As illustrated in step 110, the criterion generator employs the group criterion message and the private key of the criterion generator 10 to generate a digital signature for the message. The digital signature may be generated via any suitable technique for creating a digital signature as known in the art. The group criteria message and the digital signature applicable thereto are then distributed to one or more criteria evaluators, such as criteria evaluators 18, as depicted in step 112.

Figure 3:
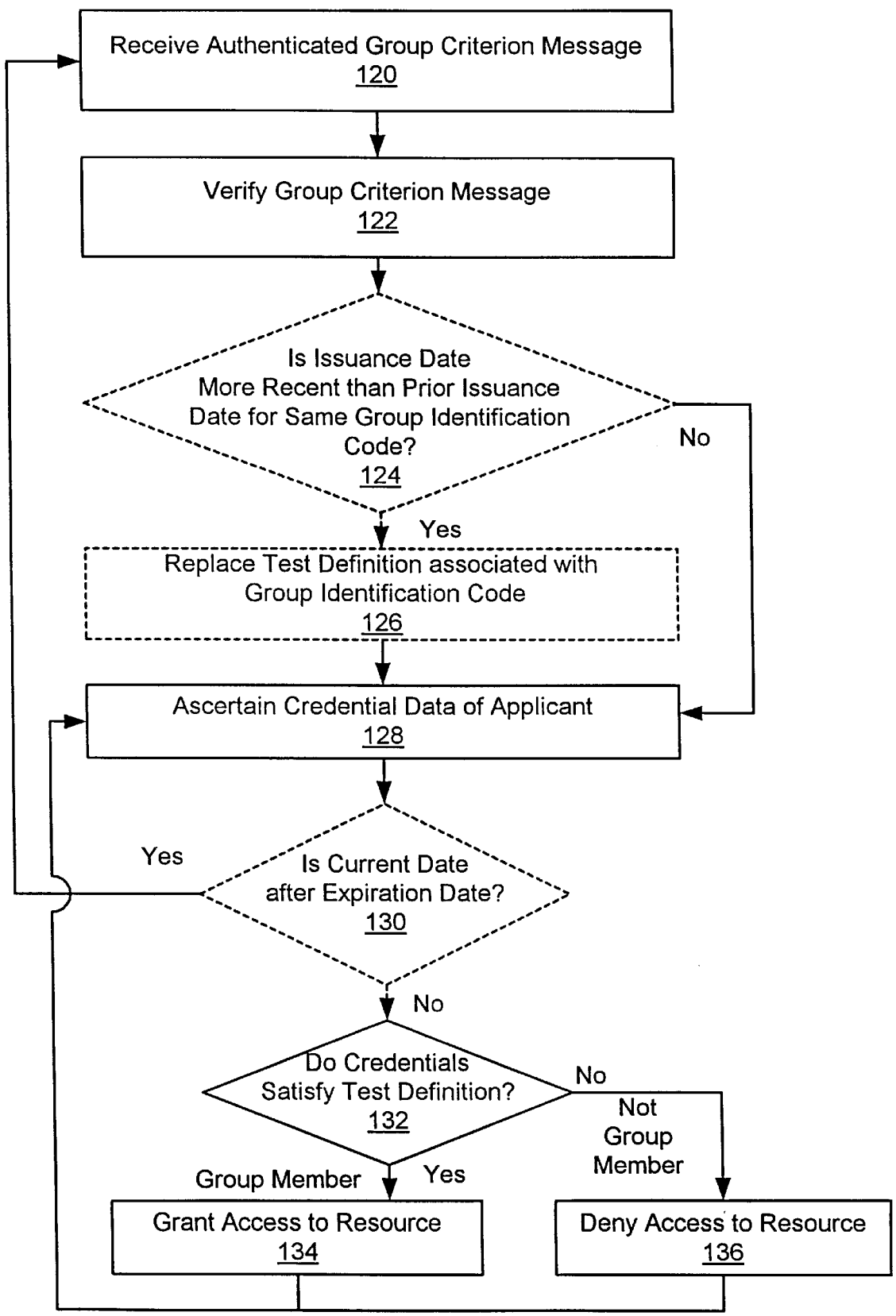
FIG. 3 is a flow diagram illustrating a method of operation for the criterion evaluator depicted in FIG. 1.

A method of operation of a criterion evaluator 18 consistent with the present invention is illustrated by reference to FIGS. 1 and 3. The criterion evaluator 18, as illustrated in step 120, receives the group criterion message and the associated digital signature. The group criterion message is verified, as depicted in step 122, using the public key of the criterion generator to assure that no modifications have been made to either the group criterion message. As illustrated in the optional inquiry step 124, a test may be performed to ascertain whether the issuance date of the received test criteria is more recent than a prior issuance date for test definition pertaining to the same group identification code. If the issuance date for the received test definition is more recent than the prior issuance date for criteria pertaining to the same group identification code (i.e., there is an issuance date which is more recent than a prior issuance date for the same group identification code or the received test definition is the first test definition for the respective group identification code), the test definition (if any) pertaining to the group identification code is replaced with the new test definition or stored as illustrated in step 126. If the issuance date is not more recent than the issuance date of a test definition pertaining to the same group identification code (i.e., the test definition is older than the issuance date stored for a test definition pertaining to the same group identification code) control passes to step 128. After the message has been verified, an applicant causes his credentials to be submitted to the criterion evaluator for comparison against the test definition as depicted in step 128. The credentials may be directly input by the applicant or obtained as a result of information supplied by the applicant from a trusted party, secure database or any other appropriate source. As illustrated in optional decision step 130, inquiry may be made as to whether the current date is after the expiration date. If the current date is after the expiration date for the test definition, the applicant is denied access to the resource and control is passed to step 120. In such event, the criterion evaluator awaits further input of a new authenticated group criterion message. If the current date is not after the expiration date, control passes to decision step 132. As illustrated in decision step 132, if the credentials satisfy the test definition, the applicant is confirmed as a member of the group and rights of access to the relevant resource are granted as depicted in step 134. Control then passes to step 128 and the criterion evaluator awaits further credentials for evaluation. In the event that the applicant's credentials do not satisfy the test definition, the applicant is denied access to the resource as illustrated in step 136. Control then passes to step 128 and the criterion evaluator awaits further credentials for evaluation. In accordance with the foregoing method, access to resources is determined without reference to an explicit list or group members.

Those skilled in the art should readily appreciate that the programs defining the functions of the present invention can be delivered to a computer in many forms; including, but not limited to: (a) information permanently stored on non-writable storage media (e.g., read-only memory devices within a computer such as ROM or CD-ROM disks readable by a computer I/O attachment; (b) information alterably stored on writable storage media (e.g., floppy disks, tapes, read/write optical media and hard drives); or (c) information conveyed to a computer through a communication media, for example, using baseband signaling or broadband signaling techniques, such as over computer or telephone networks via a modem. In addition, while in the present embodiment the functions are illustrated as being software-driven and executable out of a memory by a processor, the presently described functions may alternatively be embodied in part or in whole using hardware components such as Application Specific Integrated Circuits (ASICs), state machines, controllers or other hardware components or devices, or a combination of hardware components and software.

Those of ordinary skill in the art should further appreciate that variations to and modification of the above-described methods and apparatus for granting access to a resource may be made without departing from the inventive concepts disclosed herein. Accordingly, the invention should be viewed as limited solely by the scope and spirit of the appended claims.

What is claimed is:

1. A method for identifying whether an applicant is a member of a group comprising the steps of:
   generating in a criterion generator an authenticated message including a test definition for group membership, wherein said test definition specifies test criteria;
   verifying said authenticated message; and
   comparing said test criteria specified by said test definition to credentials associated with an applicant to determine whether said applicant is a member of said group; and
   generating a signal indicative of group membership in the event said credentials match said test criteria specified by said test definition.

2. The method of claim 1 wherein said generating step comprises the step of generating in said criterion generator an authenticated message including said test definition for group membership and a group identifying code for said group.

3. The method of claim 1 further comprising:
   between said generating and verifying steps the step of delivering said authenticated message from said criterion generator to a criterion evaluator; and
   wherein said verifying step comprises verifying said authenticated message in said criterion evaluator and said comparing step comprises comparing said test definition to credentials associated with an applicant in said criterion evaluator to determine whether said applicant is a member of said group.

4. The method of claim 3 wherein said delivering step comprises the step of transmitting said message from said criterion generator to said criterion evaluator over a network.

5. The method of claim 3 wherein said delivering step comprises:
   writing said authenticated message from said criterion generator to a transportable media; and
   reading said authenticated message from said transportable media in a reader associated with said criterion evaluator.

6. The method of claim 1 wherein said step of generating an authenticated message comprises:
   generating a message including said test definition for group membership; and
   generating a digital signature for said message; and
   associating said digital signature with said message.

7. The method of claim 6 wherein said step of generating said digital signature comprises the steps of:
   providing said criterion generator with a public key pair including a public key and a private key;
   generating a digest based at least in part upon said test definition using a predetermined hash function;
   encrypting said digest using the private key of said criterion generator to obtain said digital signature; and
   associating said digital signature with said test definition.

8. The method of claim 6 wherein said associating step comprises the step of appending said digital signature to said message.

9. A method of claim 1 further comprising the step of granting said applicant access to a computer resource in response to the generation of said signal indicative of group membership.

10. The method of claim 1 further comprising the step of granting said applicant predetermined rights within a computer system in response to the generation of said signal indicative of group membership.

11. The method of claim 10 wherein said predetermined rights include the right of access to a directory.

12. The method of claim 10 wherein said predetermined rights include the right to read a file.

13. The method of claim 10 wherein said predetermined rights include the right to modify a file.

14. The method of claim 10 wherein said predetermined rights include the right to read a web page.

15. The method of claim 10 wherein said predetermined rights include the right to modify a web page.

16. The method of claim 1 further comprising the step of activating an electromechanical device in response to the generation of said signal indicative of group membership.

17. The method of claim 16 wherein said electromechanical device comprises a lock.

18. The method of claim 1 wherein said message further includes an issuance date identifying the date on which said test definition was issued.

19. The method of claim 1 wherein said authenticated message further includes an expiration date identifying the date upon which the test definition expires.

20. The method of claim 19 wherein said signal generating step comprises the step. of generating a signal indicative of group membership in the event said credentials match said test criteria specified by said test definition and the current date is not greater than said expiration date.

21. The method of claim 1 wherein said method further includes the step of generating an access control message that indicates that the applicant's credentials satisfy said test definition in response to the generation of said signal indicative of group membership.

22. The method of claim 1 further comprising:
   inputting applicant identifying information; and
   obtaining at least some information forming at least a portion of said credentials from a certification authority in response to the inputting of said applicant identifying information.

23. A method of updating a definition of a test for membership within a group comprising the steps of:
   generating a first message including a first test definition for group membership within said group and a first message order indicator, wherein said first test definition specifies first test criteria;
   generating an authenticated first message based upon said first message;
   verifying said first authenticated message;
   generating a second message including a second test definition for group membership within said group and a second message order indicator, wherein said second test definition specifies second test criteria;
   generating a second authenticated message based upon said second message;
   verifying said second authenticated message;
   comparing said first and second order indicators contained in the respective first and second messages to determine which of said predetermined messages comprises a latter message in accordance with predetermined criteria;

applying the test definition in the message associated with the latter one of said first and second order indicators to credentials associated with an applicant, wherein said applying includes comparing test criteria within said test definition in the message associated with the latter one of said first and second order indicators to said credentials associated with said applicant; and generating a signal indicative of group membership in the event said credentials match said test criteria within said test definition in the message associated with the latter of said first and second order indicators.

24. The method of claim 23 wherein said step of generating a first authenticated message comprises the step of generating a first digital signature based upon said first message and associating said first digital signature with said first message and said step of generating a second authenticated message comprises the step of generating a second digital signature based upon said second message and associating said second digital signature with said second message.

25. The method of claim 23 including the further step of granting said applicant predetermined privileges in response to the generation of said signal indicative of group membership.

26. A system for identifying whether an applicant is a member of a group comprising:

a criterion generator, said criterion generator being operative to generate an authenticated message wherein said message includes a test definition for group membership, wherein said test definition specifies test criteria;

at least one criterion evaluator, said at least one criterion evaluator being operative to receive said authenticated message, to verify said authenticated message, to compare said test criteria specified by said test definition with said credentials associated with an applicant, and to generate a signal indicative of group membership in the event said credentials associated with said applicant match said test criteria specified by said test definition.

27. A computer program product including a computer readable medium, said computer readable medium having a criterion generator computer program stored thereon, said criterion generator program for execution in a computer and comprising:

program code for generating in said criterion generator an authenticated message including a test definition for group membership within a group, wherein said test definition specifies test criteria, wherein said test criteria are for comparison with said credentials associated with an applicant, such that a signal indicative of group membership is issued in the event that said credentials associated with said applicant match said test criteria.

28. The computer program product of claim 27 wherein said program code further includes code for delivering said authenticated message to at least one other computer over a network.

29. A computer program product including a computer readable medium, said computer readable medium having a criterion evaluator computer program stored thereon, said criterion evaluator computer program for execution in a computer and comprising:

program code for receiving an authenticated message, wherein said authenticated message includes a test definition for group membership within a group, wherein said test definition specifies test criteria, for verifying said authenticated message, for applying said test definition to credentials associated with an applicant to determine whether said applicant is a member of said group, wherein said applying said test definition includes comparing said test criteria with said credentials associated with said applicant, and for generating a signal indicative of group membership in the event said credentials match said test criteria specified by said test definition.

30. A method for providing a user with an identification of test criterion for group membership comprising the steps of:

generating in a criterion generator an authenticated message including a test definition for group membership, wherein said test definition specifies test criteria;

verifying said authenticated message;

in response to a user input, outputting said test definition for access by said user;

comparing said test criteria specified by said test definition to credentials associated with said user to determine whether said user is a member of said group; and generating a signal indicative of group membership in the event said credentials match said test criteria specified by said test definition.

31. The method of claim 30 further including between said generating and verifying steps the step of delivering said authenticated message from said criterion generator to a criterion evaluator;

wherein said verifying step comprises the step of verifying the contents of said authenticated message in said criterion evaluator.

32. The method of claim 30 wherein said outputting step comprises the step of displaying information associated with said test definition on a video display in response to said user input.

33. A computer data signal, said computer data signal including a computer program for use in identifying members of a group, said computer program comprising:

program code for generating an authenticated message including a test definition for group membership within a group, wherein said test definition specifies test criteria, wherein said test criteria are for comparison with said credentials associated with an applicant, such that a signal indicative of group membership is issued in the event that said credentials associated with said applicant match said test criteria.

34. A computer data signal, said computer data signal including a computer program for use in identifying members of a group, said computer program comprising:

program code for receiving an authenticated message, wherein said authenticated message includes a test definition for group membership within a group, wherein said test definition specifies test criteria, for verifying said test definition, for applying said test definition to credentials associated with an applicant to determine whether said applicant is a member of said group, wherein said applying said test definition includes comparing said test criteria with said credentials associated with said applicant, and for generating a signal indicative of group membership in the event said credentials match said test definition.

35. Apparatus for identifying whether an applicant is a member of a group comprising:

means for generating an authenticated message including a test definition for group membership in a first node, wherein said test definition specifies test criteria;

means for conveying said authenticated message from said first node to a second node;

means for verifying said authenticated message in said second node; and means for comparing said test criteria to credentials associated with an applicant in said second node to determine whether said applicant is a member of said group; and means for generating a signal indicative of group membership in the event said credentials match said test definition.

36. A method for identifying whether an applicant is a member of a group comprising the steps of:

generating an authenticated message including a test definition for group membership, wherein said test definition specifies test criteria;

verifying said authenticated message;

comparing said test criteria to credentials associated with said applicant to determine whether said applicant is a member of said group; and generating a signal indicative of group membership in the event said credentials match said test criteria.

37. The method of claim 36 wherein said verifying step comprises the step of verifying the contents of said authenticated message in a criterion evaluator.

38. The method of claim 37 wherein between said generating and said verifying steps said method includes the step of delivering said authenticated message to said criterion evaluator.

39. The method of claim 38 wherein said delivering step includes the step of transmitting said authenticated message over a computer network to said criterion evaluator.

* * * * *

UNITED STATES PATENT AND TRADEMARK OFFICE
CERTIFICATE OF CORRECTION

PATENT NO. : 6,263,434 B1
DATED : July 17, 2001
INVENTOR(S) : Stephen R. Hanna et al.

It is certified that error appears in the above-identified patent and that said Letters Patent is hereby corrected as shown below:

<u>Column 10,</u>
Line 1, "A method of" should read -- The method of --.

Signed and Sealed this

Eleventh Day of November, 2003

JAMES E. ROGAN
*Director of the United States Patent and Trademark Office*